United States Patent [19]
Gou et al.

[11] Patent Number: 5,754,612
[45] Date of Patent: May 19, 1998

[54] JOINT FOR INTERFACING STEEL HEAD CLOSURE AND PRESTRESSED CONCRETE REACTOR VESSEL

[75] Inventors: Perng-Fei Gou, Saratoga; Craig Delany Sawyer, Los Gatos; Yusef Rashed Rashid, La Jolla, all of Calif.

[73] Assignee: General Electric Company, San Jose, Calif.

[21] Appl. No.: 632,038

[22] Filed: Apr. 12, 1996

Related U.S. Application Data

[63] Continuation-in-part of Ser. No. 428,810, Apr. 24, 1995, Pat. No. 5,577,085.
[51] Int. Cl.⁶ .................................................. G21C 13/00
[52] U.S. Cl. .......................... 376/295; 376/296; 376/289; 376/285; 376/205
[58] Field of Search ................................ 376/205, 285, 376/289, 295, 296, 298

[56] References Cited

U.S. PATENT DOCUMENTS 4,534,140  8/1985  Malaval ............................. 376/296

5,577,085  11/1996  Gou et al. ......................... 376/296

*Primary Examiner*—Daniel D. Wasil
*Attorney, Agent, or Firm*—James E. McGinness; Dennis M. Flaherty

[57] ABSTRACT

A joint for interfacing a steel head closure and a steel-lined prestressed concrete reactor vessel (PCRV). The steel head closure is bolted to a thick steel annular plate and a thermal barrier is arranged in a volume bounded by the head ring, the liner and the concrete of the PCRV wall. The thermal barrier is made of zirconia sand or other material having a low thermal conductivity, a high bulk modulus equal to that of concrete, and a low shear modulus. Differential thermal expansion of the vessel head closure and PCRV is accommodated by a flexible connection of the PCRV liner to the inner periphery of the head ring. In the alternative, the steel head closure is interfaced to the top of the PCRV via a sliding joint or a thermal stress relief ring. In accordance with a further alternative, thermal stresses in the steel vessel head closure are mitigated by reducing the temperature of the head closure by installing thermal insulation on all internal surfaces thereof.

15 Claims, 8 Drawing Sheets

JOINT FOR INTERFACING STEEL HEAD CLOSURE AND PRESTRESSED CONCRETE REACTOR VESSEL

RELATED PATENT APPLICATION

This application is a continuation-in-part application of U.S. patent application Ser. No. 08/428,810 filed on Apr. 24, 1995, now U.S. Pat. No. 5,577,085.

FIELD OF THE INVENTION

This invention relates to systems for isolating the reactor pressure vessel of a nuclear reactor in the event of a loss-of-coolant accident. In particular, this invention relates to the construction of a nuclear reactor comprising a prestressed concrete reactor vessel (PCRV) having a large head opening which is closed by a steel head closure.

BACKGROUND OF THE INVENTION

The evolution of nuclear reactor systems of the water reactor type has led to the development of such systems in the 2000-MWe plus range and to utilization of stainless steel reactor pressure vessels wherein operating pressure is about 1000 psi. These reactor vessels have reached an internal diameter of about 13 m. Manufacture of vessels of this size involves special fabrication requirements not easily met, especially since fabricators capable of fulfilling such a manufacturing task are few. Also with a practical steel vessel diameter limitation of less than 13 m, making numerous penetrations (for cooling lines, steam lines, feedwater lines, instrumentation lines, control rod lines, etc.) through a steel vessel wall is difficult. The result is an undesirably complex reactor pressure vessel structure and less than optimal system capacity.

To address this problem, a prestressed concrete reactor pressure vessel comprising a steel inner liner has been proposed. The use of a prestressed concrete reactor pressure vessel allows for a very large fuel core, simplifies the approach to plant safety and provides a mild response to a plant transient. The use of prestressed concrete construction removes the current size limitations imposed by the steel reactor vessels due to existing steel fabrication capacity. This enables the design of a super large-sized natural circulation reactor having a low-power-density core and high plant output power.

A prestressed concrete reactor pressure vessel and associated isolation system have been proposed which are suitable for use in both natural and forced circulation reactors. To reduce reactor building and containment costs, the reactor is designed so that the only safety response needed for any loss-of-coolant accident (LOCA) event is reactor isolation. By designing a highly reliable isolation system which can stabilize the reactor pressure and maintain water inventory, the suppression pool and conventional containment can be replaced by the isolation system. The isolation system effectively eliminates the possibility of a LOCA or severe accident occurring.

In accordance with the proposed reactor design, a steel-lined prestressed concrete reactor vessel (PCRV) houses the reactor internal components, fuel and coolant. The pressure retention capability of the PCRV is provided by prestressing tendons extending in both the hoop direction and the meridional direction, with galleries providing access to perform inspection and to prestress tendons.

The proposed reactor design further incorporates the concept of a high-pressure containment head closure to provide a redundancy in addition to a conventional steel reactor vessel head closure. The containment head closure comprises a steel closure attached to the PCRV such that a well is formed between the vessel head and containment head closures. In the event of a leak in the vessel head closure, the containment head closure will contain the pressurized fluid which enters the well.

A reactor with a PCRV can serve as its own containment since catastrophic failure of the PCRV is precluded by the compression in the PCRV wall and the redundancy in the tendons that provide compression. Isolation valves are used to isolate the reactor vessel in the event of a LOCA. Because the vessel isolation can be easily integrated into the PCRV design, a traditional large containment is not required.

The proposed reactor design further provides that penetration lines and piping, representing pressure vessel nozzles, be surrounded by guard piping, and the guard piping is extended to cover at least the first (in-board) isolation valve. The guard piping is placed around piping through penetrations as a second barrier and defense against primary pressure system boundary pipe break. The space between the primary system pressure boundary pipe and guard piping is pressurized to an intermediate pressure and monitored during operation. If any break in piping connected to the reactor pressure boundary occurs, loss of reactor vessel inventory will be rapidly terminated by actuation of the isolation valves. If the entire reactor needs to be isolated as a result of a pipe break, isolation condensers will remove the long-term decay heat and maintain vessel inventory. Other emergency core cooling systems are not needed since loss of coolant is quickly terminated and there will be no substantial loss of inventory from the PCRV.

In accordance with the proposed reactor design, a thick steel annular plate, of thickness in the range of 25–40 cm, is anchored at the PCRV wall top surface to provide anchorage for tendons, to strengthen the large head opening of the vessel, and to transfer loads from the vessel head closure to the PCRV wall. During operation, the internal pressure of the reactor is about 1250 psi while the reactor temperature is about 550° F. To satisfy the concrete temperature limit imposed by the ASME Section III, Division 2, reactor vessel code for normal plant operation, a reactor wall cooling system is provided to maintain a concrete temperature below certain limits, e.g., 150° F. global and 250° F. local under normal conditions. A reactor head closure made of steel without a cooling and heavy insulation can reach a temperature of 550° F. This mismatch causes constraint against thermal expansion, which leads to excessive stress in the head flange and bolts and in the concrete at the connection. For a temperature difference of several hundred degrees Fahrenheit between the steel head closure and the PCRV wall, the combined stresses, in the head closure, of the thermal effects and the internal pressure would exceed the elastic yield limit of steel. Thus, the design of a steel vessel head closure would face many difficulties, such as thermal fatigue considerations.

SUMMARY OF THE INVENTION

The present invention is a joint which solves both the thermal fatigue problem of the steel vessel head closure and the concrete-steel interface problems that are encountered in a nuclear reactor in which an open head of a steel-lined prestressed concrete reactor pressure vessel is closed by a steel dome.

In accordance with a first preferred embodiment of the invention, the steel dome is bolted to a thick steel annular plate (hereinafter referred to as a "head ring") and a deformable thermal barrier is sandwiched between the head ring and the concrete of the PCRV wall. The head closure and head ring should be made of the same type of steel or steels having similar coefficients of thermal expansion. The thermal barrier is made of a load-bearing material, such as a zirconia sand substrate, having a low thermal conductivity, a high bulk modulus equal to that of concrete, and a low shear modulus. The load-bearing material is confined to an enclosed volume under compression by a relatively rigid wall. The shear modulus must be low enough to offer low resistance to radial displacement of the head ring and the vessel head closure. The thermal barrier insulates the concrete from the hot head ring and hot vessel head closure.

The differential thermal expansion of the vessel head closure and PCRV produces a radial displacement of the head ring relative to the concrete. This radial displacement is accommodated by a flexible connection of the PCRV liner to the inner periphery of the head ring and a flexible connection of the outer periphery of the head ring to a second annular steel plate which furnishes an anchorage surface for vertical tendons of the PCRV.

The use of a thermal barrier in accordance with the first preferred embodiment of the invention relieves the thermal stresses in the steel vessel head closure. Thus, thermal fatigue of the steel vessel head closure is no longer an issue. The use of a flexible liner connection accommodates the differential thermal expansion between the steel and the PCRV concrete. The use of a head ring that acts as a transition mechanism between the steel vessel head closure and the PCRV solves the interface problems. In addition, the head ring strengthens the PCRV around the large head opening and also furnishes an anchorage surface for the vertical tendons of the PCRV.

In accordance with a second preferred embodiment of the invention, the steel dome is interfaced to the top of the PCRV via a sliding joint which allows the flange of the steel dome to expand radially without excessive thermal stresses. The sliding joint comprises a bearing plate ring installed on the top surface of the PCRV and a head ring, to which the steel dome flange is bolted, installed on top of the bearing plate ring. A low-friction interface allows the head ring to expand radially relative to the bearing plate ring. To minimize stresses between the concrete and the bearing plate, the bearing plate is constructed in ring segments rather than a continuous ring. This slotted plate reduces the thermal expansion in the radial direction and provides expansion compatibility between the bearing plate and the concrete. As an additional measure to reduce the thermal expansion of the bearing plate, a plurality of pipes carrying recirculating coolant are welded to the bottom surface of the bearing plate and embedded in the concrete immediately below the bearing plate. In accordance with variations of the second preferred embodiment, the low-friction interface may comprise a graphite or Teflon coating, a multiplicity of pads made of graphite-steel alloy or a thermal stress relief ring made of a molybdenum alloy containing small amounts of titanium and tungsten.

In accordance with a third preferred embodiment, thermal stresses in the steel vessel head closure are mitigated by reducing the temperature of the head closure. The temperature is reduced by installing thermal insulation on all internal surfaces of the head closure and by cooling the outer surface of the head closure. The outer surface of the head closure can be cooled by means of cooling pipes carrying circulating coolant (e.g., water); by means of forced circulation of cooling air blown in from one side and removed from the other side; or by natural circulation of air in the cavity by maintaining cool surfaces. This can reduce the temperature of the head to less than 400° F.

A further feature of the third preferred embodiment is the elimination of the bearing plate. Instead of sliding on a bearing plate, the head ring is anchored directly to the PCRV by the tendons. To minimize the thermal expansion of the head ring, a plurality of pipes carrying recirculating coolant are welded to the bottom surface of the head ring and embedded in the concrete immediately below the head ring. Also the inner surface of the liner is covered with thermal insulation which extends to the elevation of the head ring. The thermal insulation at the head ring elevation restricts the amount of heat transferred to the head ring from inside the liner. In addition, cooling pipes are welded to the outer surface of the liner and embedded in the concrete to cool the concrete. The PCRV liner is fully attached to the head ring.

DETAILED DESCRIPTION OF THE PREFERRED EMBODIMENTS

Figure 1:
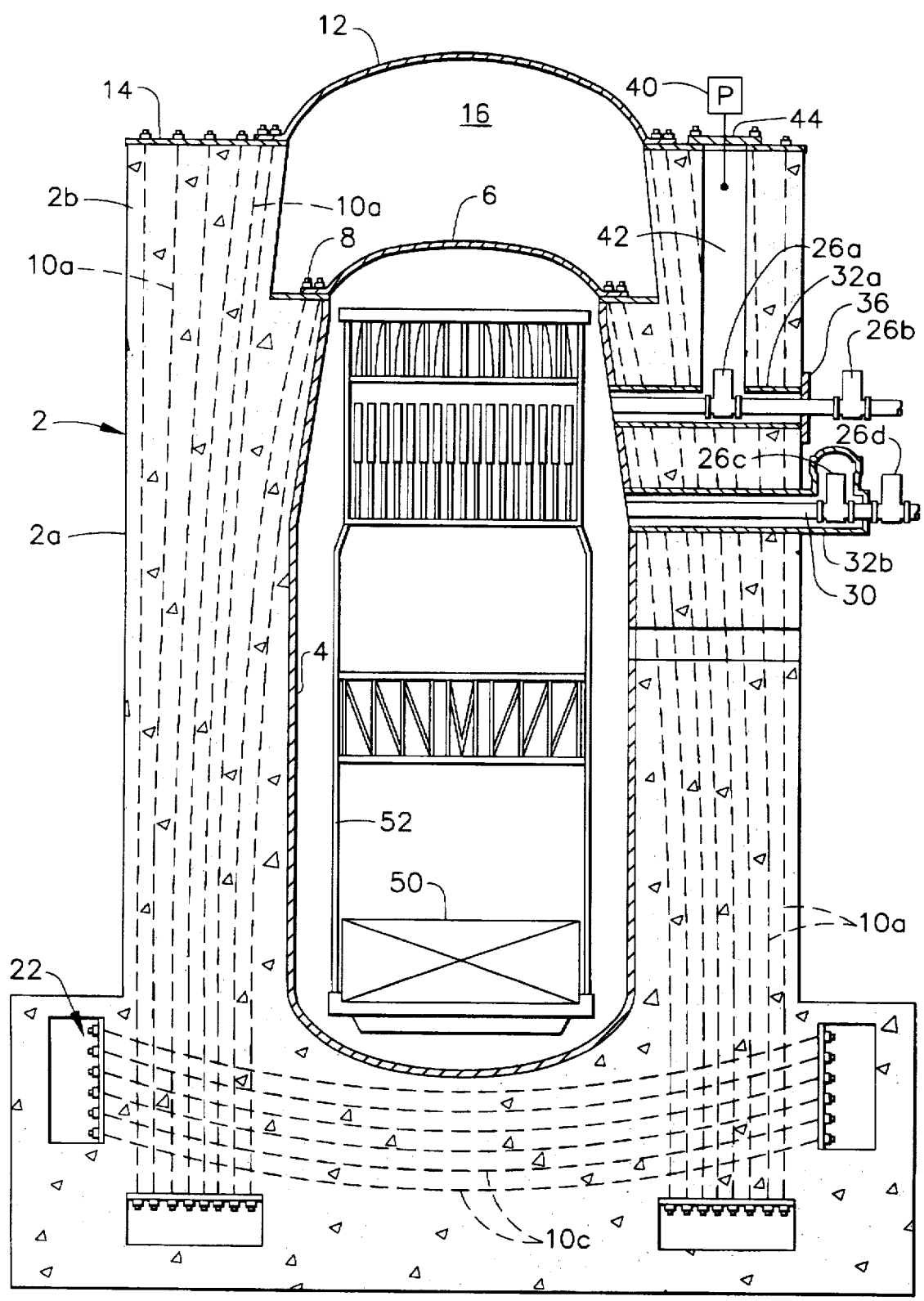
FIG. 1 is a schematic diagram showing a natural circulation reactor having a steel-lined prestressed concrete reactor pressure vessel, double steel head closures, and a main steam line which penetrates the inner steel liner.

FIG. 1 illustrates the basic prestressed concrete reactor pressure vessel concept which has complete prestressed concrete construction including the penetration regions. The natural circulation reactor shown in FIG. 1 has a prestressed concrete reactor vessel (PCRV) 2 comprising a pressure vessel portion 2a, which is lined on its internal surface with a steel liner 4, and a containment portion 2b, which extends upward from the top of the pressure vessel portion 2b. The fuel core 50 is supported inside the fuel core shroud 52, which is in turn supported in an upright position by the PCRV. The top of the pressure vessel portion 2a is closed by a steel dome 6 which has an annular flange held down by tensioned nuts 8 coupled to the ends of respective vertical tendons 10a (indicated by dashed lines) which pass through ducts or tubes (not shown) embedded in the concrete. Similarly, the top of the containment portion 2b is closed by a steel dome 12 which has an annular flange held down in a manner similar to that described for dome 6. The steel domes 6 and 12 and containment 2b form a well 16 for containing gases which may escape from the pressure vessel in the event that the seal of dome 6 leaks. The seal is supposed to be the weakest link that can fail before any part of the steel-lined PCRV 2 or dome 6 fails.

The most distinguishing feature of a prestressed concrete reactor pressure vessel is the degree of redundancy that exists in structure. The structural redundancy in a PCRV is rooted in the fact that a large number of prestressing tendons are required to break at exactly the same instant, making a catastrophic failure virtually impossible.

Taking advantage of this behavior and the redundancy in tendons, the PCRV can serve as a containment itself. Thus, it was deemed desirable to extend the prestressed concrete construction to include the reactor head as shown in FIG. 1. A steel annular plate 14 is anchored at the PCRV wall top surface to provide anchorage for tendons 10a and to transfer loads from the vessel head closure to the PCRV wall. The vessel is lined with a steel liner 4 on the inside surface to maintain leaktightness.

The pressure retention capability of the PCRV 2 is provided by the hoop prestress that is produced by hoop tendons anchored at buttresses (not shown), and the meridional prestress that is produced by the longitudinal tendons 10a anchored at the top and bottom of the PCRV wall, as shown in FIG. 1. A circular gallery 24 is placed at the bottom of the PCRV for the lower anchors. The prestress in the lower head is provided by a number of layers of tendons 10c that are anchored to the inside wall of a lower head tendon gallery 22. The PCRV can have three or more buttresses. The shape of the gallery is hexagonal if there are three buttresses; it is octagonal if there are four buttresses. The penetrations for the main steam lines, feedwater lines and emergency core cooling lines are placed in the upper portion of the PCRV. The tendons are routed around the large penetration openings in the PCRV wall, such as the one for the main steam line. Catastrophic failure of the PCRV is precluded because of the compression in the PCRV wall, which is in contrast to the state of tensile stress in a steel vessel subjected to internal pressure loads.

The reactor design shown in FIG. 1 includes a pair of main steam isolation valves (MSIVs) 26a and 26b installed in a main steam line 28, and a pair of feedwater isolation valves (FWIVs) 26c and 26d installed in a feedwater line 30. The main steam line 28 penetrates inner steel liner 4 and the wall of PCRV 2, and is encased by guard piping 32a with an intermediate space 34 therebetween. Intermediate space 34 is closed off at one end by a cover plate 36 bolted to the top of the PCRV 2. Cover plate 36 also supports the main steam line 28. The MSIV 26b may be located outside the PCRV. To protect the concrete against high temperatures, cooling water piping (not shown) can be embedded in the circumferential region surrounding the guard piping 32a.

The in-board MSIV 26a inserted in main steam line 28 is placed in a protective canister in the form of a circular cylindrical vertical valve tunnel 42 closed at the top by a cover plate 44. The canister 42 provides leakage control with provision for maintenance access. The valve tunnel cover plate 44 mounted to the top surface of the PCRV maintains the continuity of the primary containment boundary. The continuity of the containment boundary is also maintained at the exit side of the main steam line tunnel by mounting cover plate 36 over the tunnel penetration and allowing the main steam line 28 to pass through the cover. The pressure in the valve tunnel volume is monitored to detect any internal or external leakage. Upon detection of leakage either in the valve access tunnel or in the main steam line penetration tunnel, the reactor will isolate (isolation valves close and isolation condensers operate to maintain reactor pressure and level), and the reactor is shutdown (insertion of control rods) for repair.

The guard piping is placed around piping through penetrations as a second barrier and defense against primary pressure boundary pipe break. The space between the primary pressure boundary pipe and guard piping is pressurized to an intermediate pressure and monitored by a pressure sensor 40 during plant operation. If pressure should suddenly increase in this space, it indicates a break in the primary pressure boundary. If pressure should suddenly decrease in this space, it indicates a break in the guard piping. In either case, the reactor will be shutdown in a controlled manner without loss of coolant as a safe action until repairs can be made.

The design of the steel vessel head and its connection to the PCRV is a critical issue in a nuclear reactor of the type shown in FIG. 1 since the ASME code requires that structural concrete be maintained at or below 150° F., while the steel vessel head closure may be near reactor operating temperatures of 550° F. This mismatch causes constraint against thermal expansion, which leads to excessive stress in the head flange and bolts and in the concrete at the connection. The two options available to mitigate this situation are: (1) to design a flexible connection that allows relative radial motion between the vessel head closure and the PCRV to accommodate thermal expansion; and (2) to reduce the temperature in the vessel head closure so that the differential thermal expansion between the PCRV and seal head is minimum and thermal stresses are low enough to be accommodated in the head closure, flange, bolt and connection design. FIGS. 2–6 are schematics depicting preferred embodiments of the former head concept; FIG. 7 is a schematic depicting a preferred embodiment of the latter concept.

Figure 2:
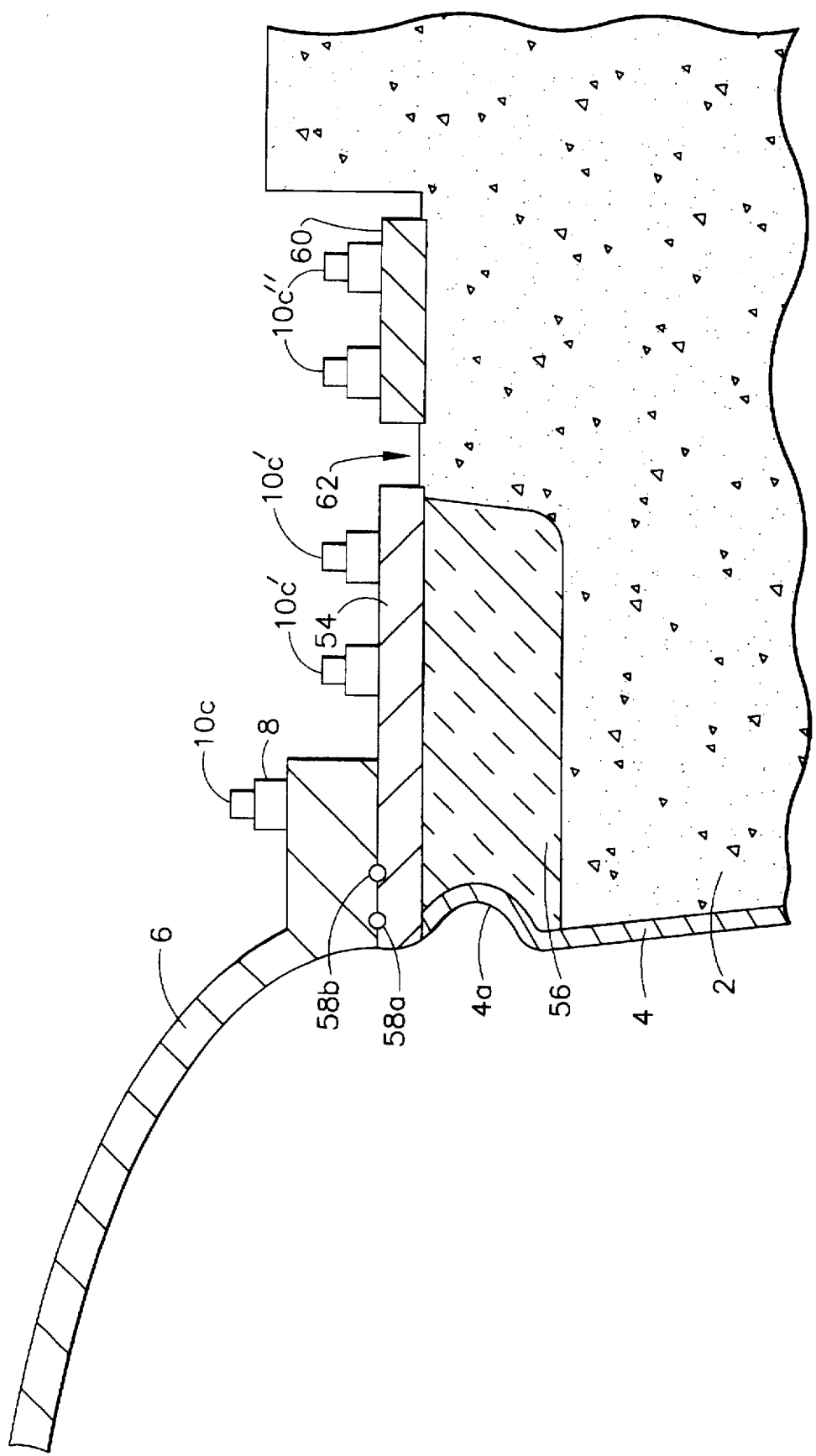
FIG. 2 is a sectional elevation view of a thermal barrier for interfacing a steel head closure to a prestressed concrete reactor pressure vessel in accordance with a first preferred embodiment of the invention.

Referring to FIG. 2, a first preferred embodiment of the connection between a steel vessel head closure and a PCRV comprises an annular plate or head ring 54 and a thermal barrier 56, which occupies a volume bounded by head ring 54, the concrete of PCRV wall 2 and steel liner 4. The upper edge 4a of steel liner 4 is welded to a radially innermost peripheral portion of the head ring 54.

The steel head closure 6 is held tightly against the head ring by vertical tendons 10c (only one of which is seen in FIG. 2) which apply a downward force on the upper surface of the steel head flange 6a via tensioned nuts 8. The interface between the steel head flange 6a and the head ring 54 is sealed by a pair of O-rings 58a and 58b. The radially outermost portion of head ring 54 is held down by additional vertical tendons 10c'. An annular steel plate 60 having an inner radius greater than the outer radius of head ring 56 is used to anchor vertical tendons 10c".

In accordance with the concept of the present invention, the reactor is designed so that the O-rings 58a and 58b (or any other suitable sealing means) are the weakest link in the pressure vessel. In the event of overpressure inside the pressure vessel, leakage will occur through the reactor head sealing means. As a result, the leakage is contained in the well or cavity 16. The vessel leakage at the head seal is the preferred limit for overpressure margin because it is easily detected and is non-destructive. The leakage causes reduction in the pressure differential across the head and will tend to re-close the head seal. Because of this feature, other less desirable failure modes are eliminated.

The thermal barrier 56 is preferably comprised of a zirconia sand substrate. The provision of a shifting foundation of zirconia sand underneath the head ring 54 allows the head ring to thermally expand in a radial direction relative to the concrete without generating unacceptable stresses. An annular gap 62 is provided between the head ring 54 and anchorage plate 60 to allow for differential thermal expansion in the radial direction, since the anchorage plate 60 will be at a lower temperature than the head ring and consequently will experience less radial expansion. The thermal insulating properties of the zirconia sand protect the concrete against exposure to the high temperature of the head ring. The low shear modulus of zirconia sand offers low resistance to radial displacement of the head ring 54 and the vessel head closure 6. Thus, the thermal barrier relieves the thermal stresses in the steel vessel head closure.

As stated above, the thermal barrier 56 insulates the concrete of the PCRV 2 from the hot head ring 54 and the hot vessel head closure 6. From a preliminary thermal analysis, the concrete temperature adjacent to the barrier 56 is about 250° F., which is allowed by the ASME Section III Code for a local region. The temperature of the head ring may approach the temperature of the steel dome (i.e., 550° F. during reactor operation). The radial displacement for this temperature range is estimated to be of the order of 0.5 inch. This radial displacement is accommodated by a flexible connection 4a of the PCRV liner 4. This flexible connection 4a may take the form of an expandable bellows or flexible seal. The flexible liner connection accommodates the radial differential thermal expansion between the steel and the PCRV concrete and provides a large axial thermal gradient.

Figure 3:
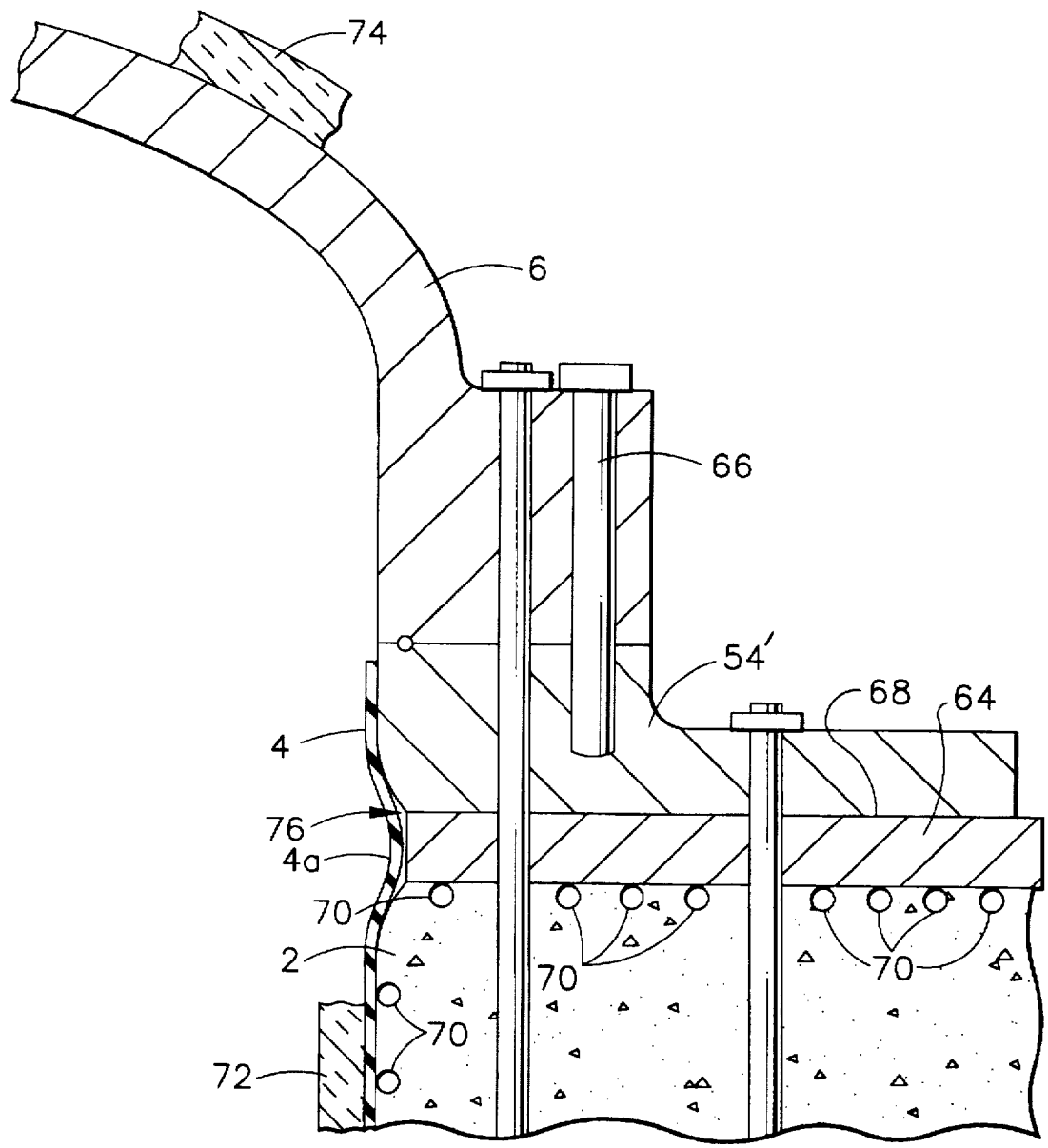
FIG. 3 is a sectional elevation view of a sliding joint for interfacing a steel head closure to a prestressed concrete reactor pressure vessel in accordance with a second preferred embodiment of the invention.

FIG. 3 depicts a second preferred embodiment of the invention in which the steel dome 6 is interfaced to the top of the PCRV 2 via a sliding joint which allows the flange 6a of the steel dome to expand radially without excessive thermal stresses. The sliding joint comprises a head ring 54' which slides on a bearing plate ring 64 installed on the top surface of the PCRV. In accordance with this embodiment, the steel dome is attached to the head ring 54' by a multiplicity of stud bolts 66 (only one of which is shown in FIG. 3). A low-friction interface 68 allows the head ring 54' to expand radially relative to the bearing plate ring 64. For example, the low-friction interface may be provided by a thin film of graphite powder formed by mixing graphite powder with alcohol and then spraying the graphite/alcohol suspension onto either the bottom surface of the head ring or the top surface of the bearing plate ring. Alternatively, a layer of Teflon can be applied to either or both surfaces.

To minimize stresses between the concrete and the bearing plate 64, the bearing plate is constructed in ring segments rather than a continuous ring. This slotted plate reduces the thermal expansion in the radial direction and provides expansion compatibility between the bearing plate 64 and the concrete. As an additional measure to reduce the thermal expansion of the bearing plate 64, a plurality of pipes 70 carrying recirculating coolant are welded to the bottom surface of the bearing plate and embedded in the concrete immediately below the bearing plate.

In accordance with the proposed reactor design, cooling of the PCRV wall 2 can be accomplished by insulating the PCRV liner 4 using thermal insulation 72 made of fused silica, as shown in FIG. 3. The fused silica is cut into blocks of predetermined shape, drilled and mounted directly to the liner 4 by means of anchors (not shown). Preferably, the fused silica blocks overlap to provide continuous insulation while including clearances for thermal expansion during heat up. The use of 4.5-inch-thick fused silica insulation is proposed. In the alternative, corrugated metal sheets can be used. In addition, thermal insulation 74 covers the outer surfaces of the steel head closure 6, head flange 6a and head ring 54. The use of wool insulation which is 4 to 6 inches thick is proposed.

In accordance with the second preferred embodiment, the PCRV liner 4 must cover the edge of bearing plate 64 and attach to the head ring 54' for maintaining the pressure boundary. In the transition from the concrete to the head ring, the liner is not covered with thermal insulation. As a result, the liner undergoes a temperature change from 200° F. to near 550° F. over a distance of 1–1.5 m. This transitional portion of the liner takes the form of an expandable bellows or flexible seal 4a. The expandable bellows is designed to withstand the internal pressure to maintain the pressure boundary, to accommodate the radial motion during slippage of the head ring, and to absorb the 350° F. change in temperature without buckling. Optionally, the volume 76 between the expandable bellows 4a and the bearing plate 64 is partially filled with zirconia sand to thermally insulate the bearing plate while allowing flexure of the bellows.

The low-friction interface 68 between head ring 54' and bearing plate 64 is designed to withstand extremely large compressive forces due to the preload requirements for resisting the internal pressure. In addition, thermally induced rotation of the mating surfaces causes additional compression on the outer surface part of the contact during slippage. The low-friction integrity must be maintained since a lockup during startup could cause liftoff and leakage in the pressure boundary. Also lockup during shutdown would greatly complicate head closure removal.

Figure 4:
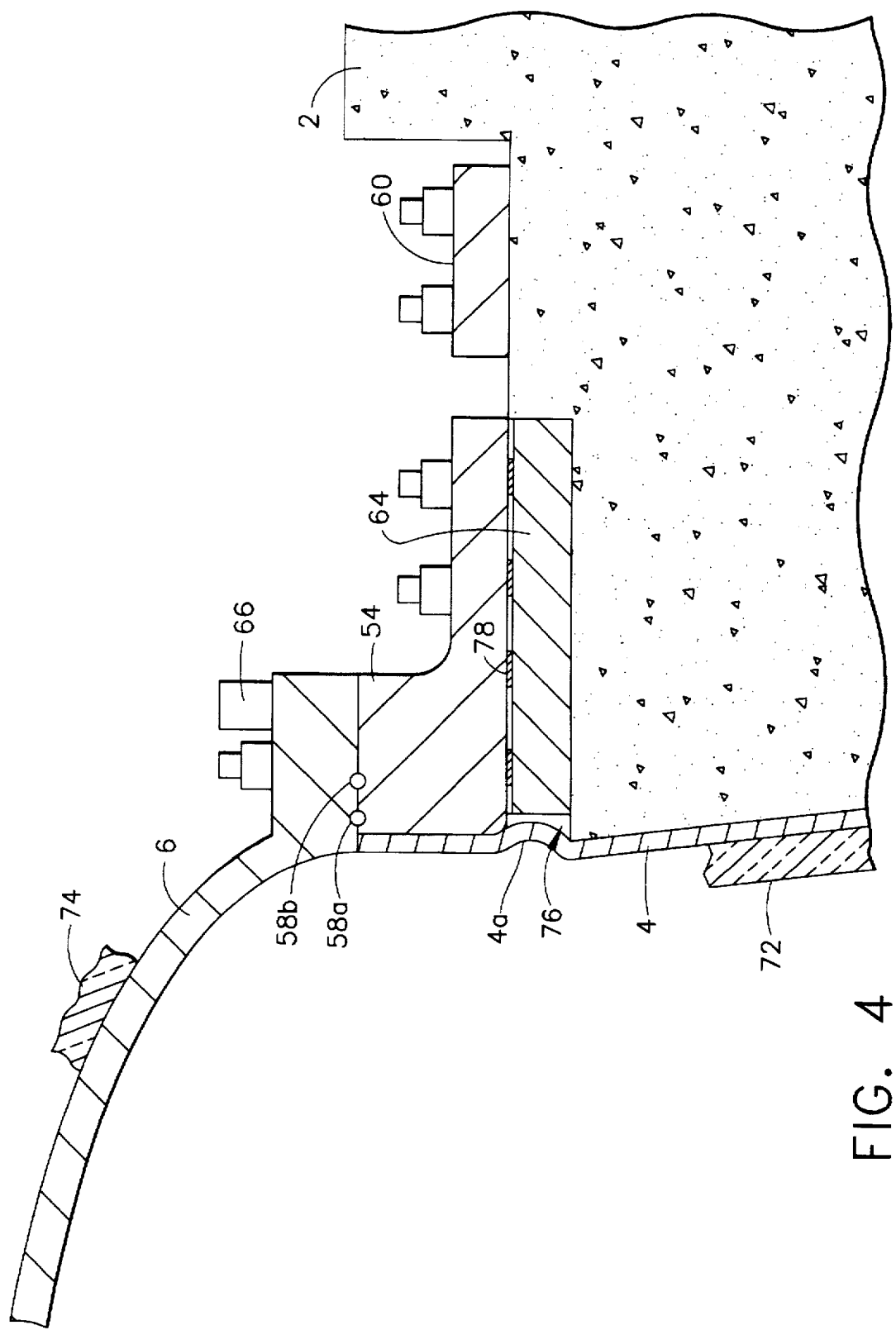
FIG. 4 is a sectional elevation view of a sliding joint with low-friction disks for interfacing a steel head closure to a prestressed concrete reactor pressure vessel in accordance with a first variation of the second preferred embodiment.
Figure 5:
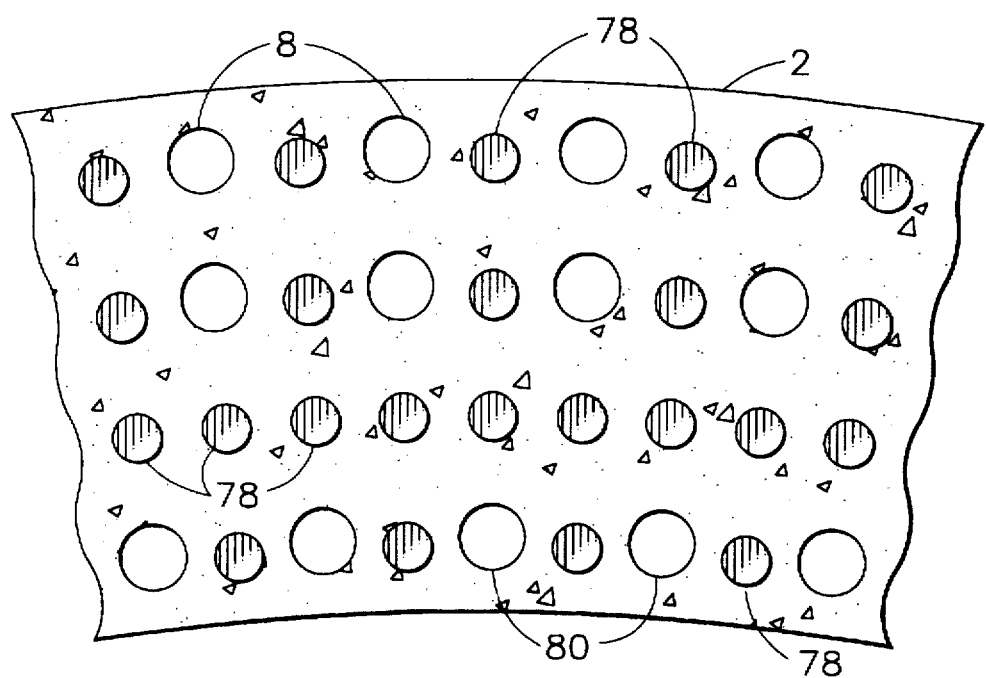
FIG. 5 is a plan view showing an arrangement of low-friction disks in accordance with the variation depicted in FIG. 4.

In accordance with a first variation of the second preferred embodiment shown in FIG. 4, the low-friction interface may comprise a multiplicity of pads 78 made of graphite-steel alloy. The arrangement of pads 78 relative to the openings 80 for tendons in the PCRV wall 4 is shown in FIG. 5. The graphite-steel alloy pads may be formed as circular disks having a 4-inch diameter. The openings 80 contain steel tubes having a diameter large enough to provide clearance for the respective tendons therein to move freely during radial expansion of the head ring 54.

Figure 6:
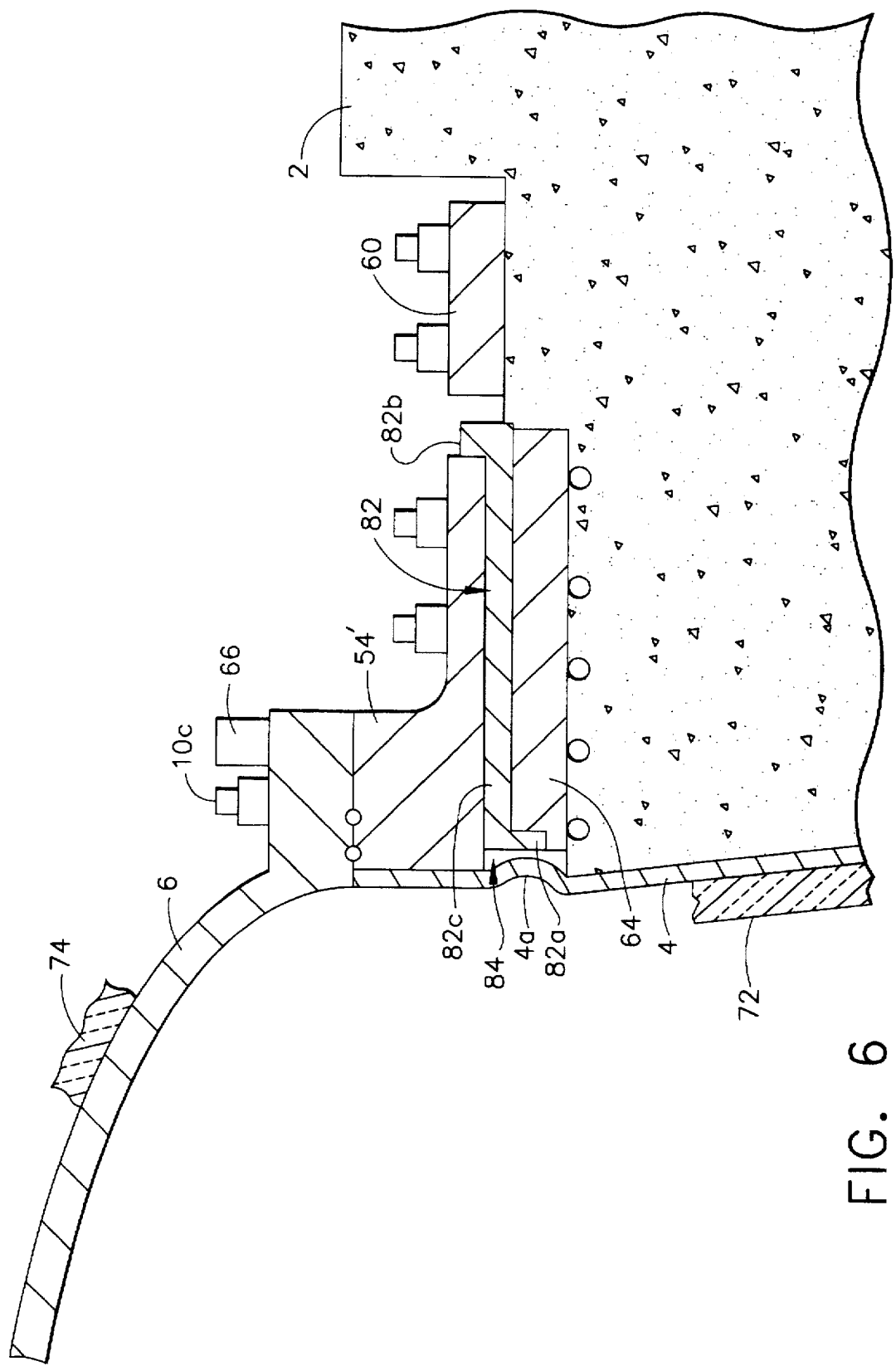
FIG. 6 is a sectional elevation view of a sliding joint for interfacing a steel head closure to a prestressed concrete reactor pressure vessel in accordance with a second variation of the second preferred embodiment.

In accordance with a second variation of the second preferred embodiment shown in FIG. 6, the low-friction interface may comprise a thermal stress relief ring 82 made of a material having a coefficient of thermal expansion that allows the thermal stress relief ring 82 to expand 50% of the differential thermal expansion between the head ring 54' and the bearing plate 64. The tensile strength of this thermal stress relief ring shall be adequate to transfer loads caused by thermal expansion plus other loads.

The thermal stress relief ring 82 has a vertically downward projecting flange 82a extending from its inner periphery and a vertically upward projecting flange 82b extending from its outer periphery. The flange 82a fits in an offset formed along the inner periphery of the bearing plate 64. The annular horizontal portion 82c of ring 82 is sandwiched between the head ring 54 and bearing plate ring 64. The preferred material is a molybdenum alloy containing a small amount of titanium for strength and a small amount of tungsten chosen to obtain the desired coefficient of thermal expansion (e.g., $3 \times 10^{-6}/°F$.).

The thermal stress relief ring 82 will expand radially outward by an amount less than the radially outward thermal expansion of the head ring 54'. As a result of the abutment of the radially outer periphery of the head ring 54' with the radially inner periphery of flange 82b, the thermal stress relief ring 82 will absorb a certain amount of thermal stress, thereby mitigating the thermal stress exerted on the concrete vessel. The volume 84 between the expandable bellows 4a and the flange 82a may optionally be partially filled with zirconia sand.

Figure 7A:
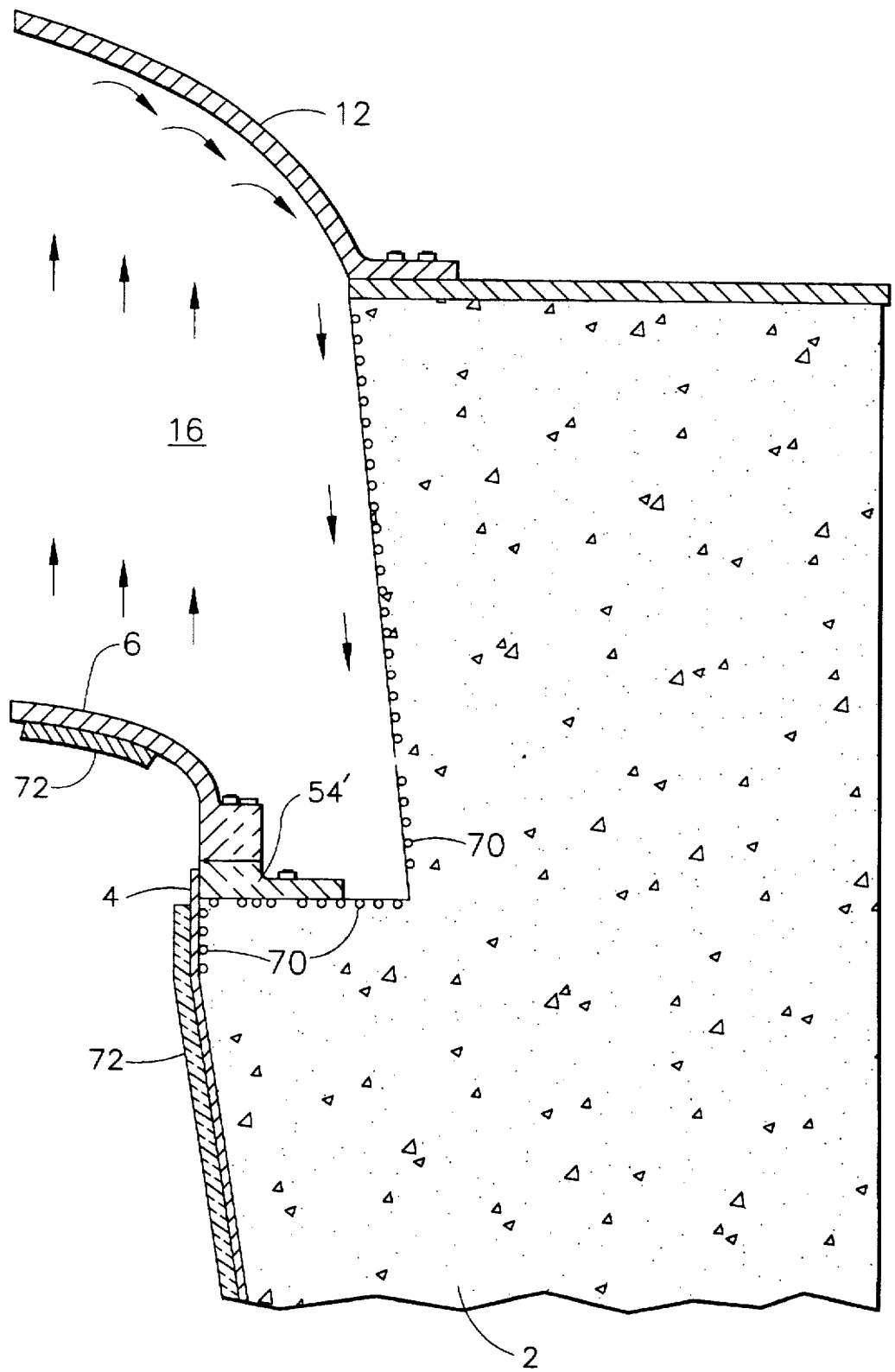
FIG. 7A is a sectional elevation view of a head ring, cooled by natural circulation, for interfacing a steel head closure to a prestressed concrete reactor pressure vessel in accordance with a first variation of a third preferred embodiment of the invention.
Figure 7B:
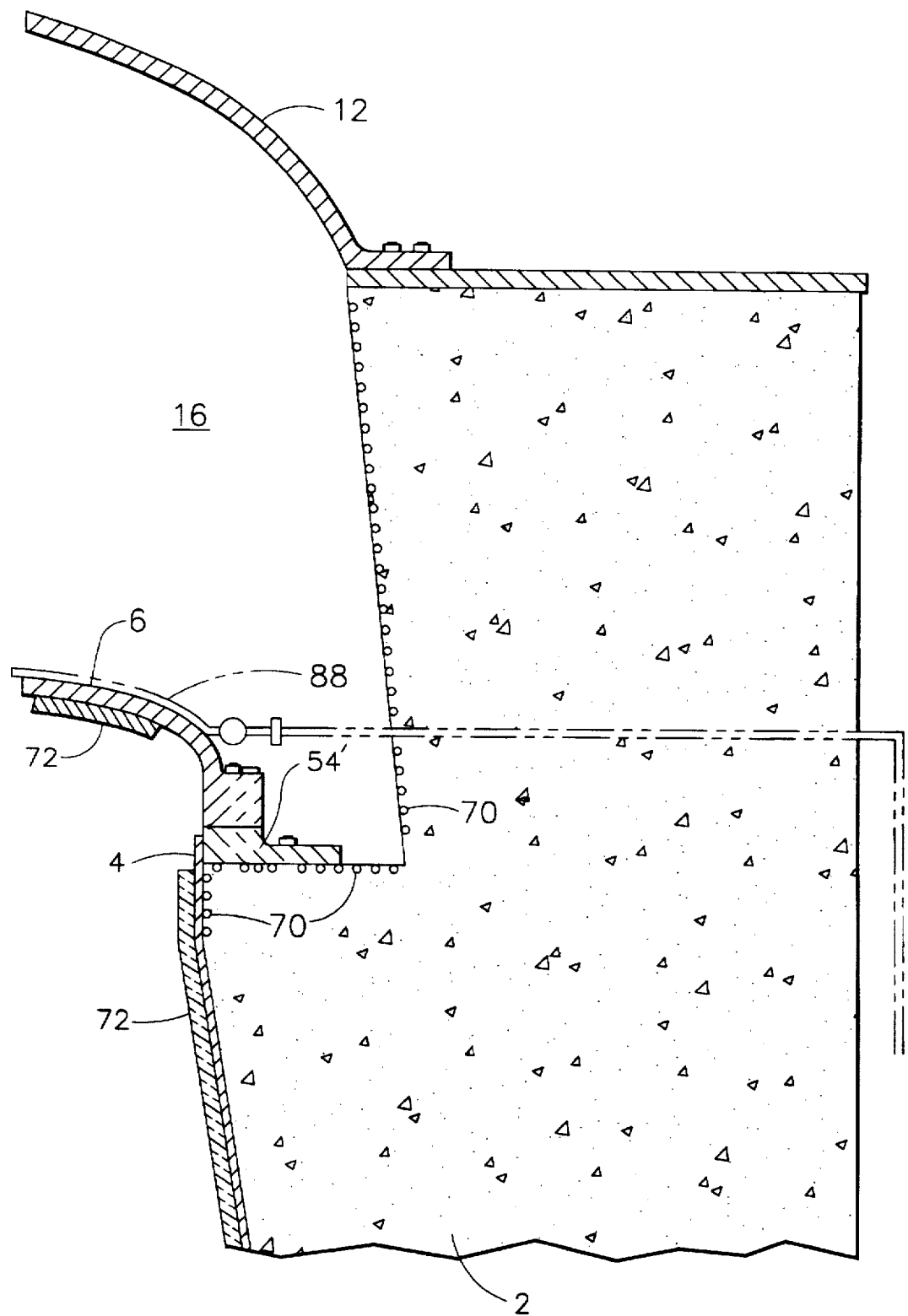
FIG. 7B is a sectional elevation view of a head ring, cooled by coolant circulating in pipes, for interfacing a steel head closure to a prestressed concrete reactor pressure vessel in accordance with a second variation of the third preferred embodiment of the invention.

In accordance with a third preferred embodiment shown in FIGS. 7A and 7B, thermal stresses in the steel vessel head closure 6 are mitigated by reducing the temperature of the steel closure. This is accomplished by extending the thermal insulation 72 (described previously with reference to FIG. 3) to cover all of the interior surfaces of the liner 4, head closure 6 and head ring 54. As previously described, this thermal insulation preferably takes the form of fused silica blocks. The exterior surfaces of the steel head closure and the head ring are cooled by natural circulation of air inside the containment cavity 16. Alternatively, a plurality of cooling pipes 88 (shown in dashed lines) carrying recirculating coolant can be attached to the exterior surface of the steel dome 6 in heat conductive relation-ship therewith and routed through the PCRV wall 4 to a recirculation pump and heat exchanger (not shown). The provision of thermal insulation on the interior surface of the head closure can reduce the temperature of the head closure to about 400° F.

In accordance with the third preferred embodiment, the head ring 54 is anchored directly to the PCRV 2 by tendons 10c and 10c'. To minimize the thermal expansion of the head ring, a plurality of pipes 86 carrying recirculating coolant are welded to the bottom surface of the bearing plate and embedded in the concrete immediately below the bearing plate. Also the thermal insulation 72 at the head ring elevation restricts the amount of heat transferred to the head ring from inside the liner 4. Additional cooling pipes are welded to the outer surface of the liner and embedded in the concrete to cool the liner.

The preferred embodiments of the present invention have been disclosed for the purpose of illustration. Variations and modifications of the disclosed structures which fall within the concept of this invention will be readily apparent to persons skilled in the art of reactor design. Although the preferred embodiments have been disclosed with reference to natural circulation reactors, the concept of the invention is equally applicable to forced circulation reactors. All such variations and modifications are intended to be encompassed by the claims set forth hereinafter.

We claim:

1. A nuclear reactor comprising:
   a concrete vessel having an open vessel head at the top thereof;
   thermal insulation material arranged to thermally insulate said concrete vessel;
   a vessel head closure made of a material different than concrete and having a flange; and
   a sliding joint for coupling said flange of said vessel head closure to said concrete vessel to close said open vessel head.

2. The nuclear reactor as defined in claim 1, wherein said sliding joint comprises:

a head ring attached to said flange of said vessel head closure and having a planar contact surface;
   a bearing plate ring attached to said concrete vessel and having a planar contact surface, said head ring and said bearing plate ring being disposed so that said respective planar contact surfaces are in mutual opposition; and
   a low-friction interface interposed between said opposing planar contact surfaces of said head ring and said bearing plate ring.

3. The nuclear reactor as defined in claim 2, wherein said low-friction interface comprises a multiplicity of pads made of low-friction material.

4. The nuclear reactor as defined in claim 2, wherein said low-friction material is a graphite-steel alloy.

5. The nuclear reactor as defined in claim 2, wherein said low-friction interface comprises a layer of low-friction material.

6. The nuclear reactor as defined in claim 2, wherein said low-friction material is graphite powder.

7. The nuclear reactor as defined in claim 2, further comprising a plurality of cooling pipes attached to said bearing plate ring and embedded in said concrete vessel.

8. The nuclear reactor as defined in claim 1, further comprising thermal insulation material covering at least a portion of an exterior surface of said vessel head closure.

9. The nuclear reactor as defined in claim 2, further comprising a metal alloy liner interposed between said thermal insulation material and said concrete vessel, wherein said metal alloy liner extends to said head ring and comprises a flexible liner portion at the elevation of said low-friction interface.

10. The nuclear reactor as defined in claim 9, wherein said flexible liner portion comprises an expandable bellows.

11. The nuclear reactor as defined in claim 1, wherein said sliding joint comprises:

a head ring attached to said flange of said vessel head closure;
    a bearing plate ring attached to said concrete vessel; and
    a thermal stress relief ring interposed between said head ring and said bearing plate ring, said thermal stress relief ring being made of a material having a tensile strength greater than the tensile strength of the material of said head ring and greater than the tensile strength of the material of said bearing plate ring and having a coefficient of thermal expansion less than the coefficient of thermal expansion of the material of said head ring.

12. The nuclear reactor as defined in claim 11, wherein said material of said thermal stress relief ring is a molybdenum alloy.

13. The nuclear reactor as defined in claim 11, wherein said thermal stress relief ring comprises an annular plate having an inner periphery and an outer periphery, an upwardly projecting flange connected to said outer periphery of said annular plate and a downwardly projecting flange connected to said inner periphery of said annular plate.

14. The nuclear reactor as defined in claim 11, further comprising a plurality of cooling pipes in heat conductive relationship with said bearing plate ring.

15. The nuclear reactor as defined in claim 2, wherein said bearing plate comprises a plurality of ring segments.

* * * * *